United States Patent Office 3,321,509
Patented May 23, 1967

3,321,509
PREPARATION OF ALKYL ESTERS OF PARA-HYDROXYBENZOIC ACID
George H. Burris, Fair Lawn, and Hyman L. Schulman, Westfield, N.J., assignors to Washine Chemical Corporation, Lodi, N.J., a corporation of New York
No Drawing. Filed Mar. 2, 1964, Ser. No. 348,785
8 Claims. (Cl. 260—473)

The present invention relates to an improved process for the production of alkyl esters of para-hydroxybenzoic acid.

The alkyl esters of p-hydroxybenzoic acid are important commodities because of their use as preservatives in food, beverages and cosmetics. These applications make it imperative that the product be as pure as possible for final consumer use. It is also important that these products be produced at reasonable cost so as to be competitive with other preservatives which can be used in similar applications.

In general, the said esters are produced by reaction of p-hydroxybenzoic acid with the corresponding alcohol and in the presence of a catalyst such as sulfuric acid. The ester produced in this manner is quite impure containing large amounts of unreacted alcohols, free acid and other impurities formed as by-products during the esterification reaction. Washing of the crude reaction mixture with water and alkali will remove some of the impurities as well as part of the water-soluble lower alcohols. However, a more refined purification procedure must be used to obtain a product suitable for use as a good preservative.

A conventional method for purification is the recrystallization of the ester from a suitable solvent. Such a procedure, while commercially practiced, has many disadvantages. It requires the use and storage of large amounts of solvent as well as the recycling of motor liquors. It requires special methods and equipment for removing the last traces of solvent from the material before it can be sold as a preservative. It entails significant losses in yields in the solvents. The use of recrystallization also has the further disadvantage that a different solvent and process is used for each ester produced. The quality of the product produced by recrystallization is not as good as that produced by the present invention, as will hereinafter appear.

A second procedure for purifying the esters of p-hydroxybenzoic acid is by simple vacuum distillation. This procedure too, while of commercial value, has many disadvantages. Prolonged heating of the material causes decomposition with the resultant formation of color bodies and a lowering of the over-all yield. Furthermore, especially in the higher esters, it is difficult to obtain a sharp separation of some impurities from the product, resulting in a less pure product as can be demonstrated by a melting point or setting point or by distinct off odors.

A technically acceptable process for the production of alkyl ester of para-hydroxybenzoic acid which is to be used as a food-preservative should have certain desirable characteristics. It should produce a product whose color, odor and purity is excellent. The process should eliminate the use of a solvent and the necessity for recycling mother liquors. That is to say, a satisfactory process should eliminate the necessity of having to remove last traces of solvent from the food additament, viz. the alkyl ester of para-hydroxybenzoic acid. Additionally, a satisfactory process should produce essentially no byproducts, such as residual and colored bodies, and, further, should make possible a sharp separation of the desired product from such impurities as are formed, thereby reducing over-all processing and enabling a very high—substantially quantitative—yield of the pure product to be realized.

The primary object of the present invention is the embodiment of an improvement in the preparation of alkyl esters of para-hydroxybenzoic acid which fulfills the enumerated desiderata, viz. yields a process which produces the said esters cheaply, without the use of solvent, and with substantially no production of by-products, to produce essentially quantitatively an ester having excellent color, odor and substantially maximal purity.

Briefly stated, the present invention essentially realizes the aforementioned object by an improvement wherein the esterification reaction product consisting essentially of a mixture of crude alkyl ester of para-hydroxybenzoic acid, unreacted starting materials and reaction-engendered impurities is subjected to treatment with live steam under controlled conditions.

In outline, the total process made possible by this invention comprises the heretofore-conventional esterification step and washing operations, followed by a special treatment with live steam. It is this special live steam treatment which is determinative, if the objective of the invention is to be realized. The said special live steam treatment is applicable for the recovery of alkyl ester of p-hydroxybenzoic acid from a mixture consisting essentially of the crude ester, residual alcohol and mineral acid, and impurities, regardless of the details of the process resulting in such a mixture.

The present invention eliminates the disadvantages encountered in both a recrystallization or a simple vacuum distillation purification procedure. It produces a material having optimal color and purity; it also increases the overall yield resulting in a definite economic advantage. Furthermore, the process is applicable to the entire series of alkyl esters of p-hydroxybenzoic acid from the methyl ester to and including the dodecyl ester. This simplifies plant equipment needs and enables the economic production even of those of the said esters which have limited sales potential.

In the practice of one embodiment this invention, the esterification reaction can be carried out in a manner known to those skilled in the art for producing optimum yield of crude ester. The crude reaction mixture may then be water-washed and excess acidity neutralized with alkali.

The crude washed ester is then heated to a temperature within the range of 100–170° C. followed by the introduction of live steam whereupon removal of impurities ensues. The reaction mixture may be mechanically agitated during the process; increase in the efficiency of the operation may thus be achieved.

The introduction of the live steam may be carried out at atmospheric pressure or under reduced pressure. Employing reduced pressure during this operation presents the advantage of increasing the efficiency of the operation and also of being able to operate at the lower end of the aforesaid temperature range, i.e., at 100–130° C., resulting in better yields. The removal of impurities is readily manifested by a steady rise in the set point or melting point of the crude to a maximum value. For example, in the preparation of n-heptyl p-hydroxybenzoate, the introduction of lie steam is continued until the set point of the dry crude ester reaches a maximum. The crude material thus obtained can be "flash" distilled with a "wiped film evaporator" or other suitable equipment. Only one pass is necessary to remove residue and produce a high quality product (e.g. M.P. 49.8° C. in the case of the n-heptyl ester) with a good overall yield. Overall yields greater than 95% are obtainable as against yields of approximately 80% for the lower esters via conventional methods. Yield increase for higher esters is even greater.

The procedure outlined above is quite surprising to those skilled in the art, since one would expect to incur side reactions, especially hydrolysis, on treatment of the ester with live steam at temperatures above 100° C. Surprisingly, no significant hydrolysis takes place; yield losses from this cause are in fact much lower than losses inherent in the usual methods of purification. The afore-disclosed method of producing the alkyl esters of p-hydroxybenzoic acid is quite superior to the conventional procedures heretofore described in that a product of superior color and purity is produced; a higher yield is obtained; a more simplified system of plant equipment is sufficient; and the method is suitable mutatis mutandis for the production of all the esters of p-hydroxybenzoic acid (from $C_1$ to $C_{12}$). The alkyl group of the said alkyl esters may be straight- or branched-chain in character.

The following represent presently-preferred illustrative embodiments of the invention:

EXAMPLE 1 n-Heptyl p-hydroxybenzoate

The esterification can be accomplished as follows:
To a glass lined or other suitable reactor are charged:

|  | Parts by weight |
|---|---|
| p-Hydroxybenzoic acid | 276.2 |
| n-Heptyl alcohol | 348 |
| 66° Bé. sulfuric acid | 15 |

The reaction mixture is heated with mechanical agitation to a temperature of 100–110° C., and the ensuing reaction allowed to proceed to completion. The resultant crude ester reaction mixture is then subjected to a washing operation in an essentially conventional manner.

The reaction mixture produced according to the above procedure is heated to a temperature of about 160–170° C. Live steam at a temperature of 100–170° C. is introduced sub-surface into the heated reaction mixture at atmospheric pressure. The passing-through of the live steam and the ensuing removal of volatile products is continued until a dried test specimen shows that the set point in the pot has reached a maximum. The live steam treatment is discontinued at this point and the ester is then dried by the application of vacuum, to a final reading of 5 to 10 mm. Hg and a pot temperature of 130 to 150° C.

The removed products may be collected in any suitable manner, e.g. in a cooled condenser, if desired.

As a final auxiliary step, the dried ester is vacuum distilled in a "wiped film evaporator" or in any other suitable vacuum still, the particular magnitude of pressure reduction being variable as desired. One pass through the equipment is sufficient to give a good yield of high quality material.

By replacing the n-heptyl alcohol by a corresponding quantity of n-dodecyl alcohol and otherwise proceeding as aforedescribed in the present example, the n-dodecyl p-hydroxybenzoate can be prepared.

EXAMPLE 2

The procedure is the same as the one described in Example 1, except that the introduction of live steam and the consequent elimination of undesired components of the reaction mixture are effected under reduced pressure, e.g., a pressure of 50–60 mm. Hg—which, however, may be varied within wide limits as desired. The use of reduced pressure is advantageous in that the reaction mixture may be heated to the much lower temperature of about 100° C. to about 130° C., rather than the higher temperature preferred when atmospheric pressure is employed, as in Example 1.

EXAMPLE 3

The procedure is the same as the one described in Example 2, except that the n-heptyl alcohol is replaced by a corresponding quantity of methyl alcohol or of ethyl alcohol while otherwise proceeding as described in the said example. The methyl p-hydroxybenzoate and ethyl p-hydroxybenzoate are thus respectively prepared.

EXAMPLE 4 n-Propyl p-hydroxybenzoate

Esterification in a glass lined or other suitable agitated reactor is effected with the following charge:

|  | Parts by weight |
|---|---|
| p-Hydroxybenzoic acid | 138.1 |
| n-Propyl alcohol | 120 |
| Toluol | 100 |
| 66° Bé. sulfuric acid | 4.5 |

The mixture is refluxed, separating and discarding the water of esterification. The reaction is continued until esterification is complete. The reaction mixture is cooled and neutralized.

Live steam at 100 to 170° C. is then introduced sub-surface into the reaction mixture and the temperature allowed to rise slowly to 100–120° C. The system is then slowly placed under vacuum and the live steam introduction and ensuing removal of volatiles continued until maximum set point (or melting point) is reached in the pot.

The n-propyl ester thus obtained may be washed by cooling to 100° C. and adding 95° C. water; maintaining at 95–100° C. while agitating; allowing a separation of the water and ester layer to take place; and siphoning off the water layer. The pH is adjusted to pH 7 with small amounts of sodium bicarbonate, if necessary.

The ester is then vacuum dried as previously described.

The dried ester may thereupon be distilled by passing through a "wiped film evaporator" or other similar apparatus to produce a water white pure product in very good yield.

By replacing the n-propyl alcohol by the corresponding amount of isopropyl alcohol and otherwise proceeding as aforedescribed in the present example, the isopropyl p-hydroxybenzate is prepared.

EXAMPLE 5

The prcedure is the same as in Example 1, except that the n-heptyl alcohol is replaced by a corresponding quantity of (a) n-butyl alcohol, (b) isobutyl alcohol, (c) n-octyl alcohol or (d) isoveleryl alcohol while otherwise proceeding as described in the said example. There are obtained (a) n-butyl p-hydroxybenzate, (b) isobutyl p-hydroxybenzoate, (c) n-octyl p-hydroxybenzoate, or (d) isovaleryl p-hydroxybenzoate, respectively.

The following table is a comparison of melting points or set points of esters produced by conventional procedures (recrystallization, simple vacuum distillation) and those produced according to the present invention. In all cases, material produced by this invention has higher values (superior purity) as well as superior color:

|  | Set or Melting Point (° C.) | |
|---|---|---|
|  | Typical Conventional Method | New Method |
| n-Methyl p-hydroxybenzoate | 125.5 | 126.8 |
| n-Ethyl p-hydroxybenzoate | 117.0 | 118.2 |
| n-Propyl p-hydroxybenzoate | 96.0 | 96.5 |
| n-Butyl p-hydroxybenzoate | 69.0 | 69.8 |
| n-Hexyl p-hydroxybenzoate | 48.0 | 48.6 |
| n-Heptyl p-hydroxybenzoate | 49.0 | 49.8 |
| n-Octyl p-hydroxybenzoate | 49.0 | 50.0 |

It is thus clear that the procedure according to the invention offers many advantages over conventional vacuum distillation or conventional recrystallization:

(a) A good yield of very high quality product is obtained. Color, odor and purity is superior to that obtained in other processes (temperature sensitivity).

(b) Eliminates handling of solvent and recycyling of mother liquors as well as the other disadvantages of recrystallization of a food product, such as removal of last traces of solvent from product.

(c) Lowers by-product formation, especially residues and color bodies.

(d) Enables a sharper separation of product from impurities, reducing over-all processing and enabling a higher yield of product.

(e) The procedure according to the invention is more economically carried out than prior procedures, and is thus technically more feasible.

Having thus disclosed the invention, what is claimed is:

1. A process for the recovery of alkyl ester of p-hydroxybenzoic acid from a reaction mixture consisting essentially of said ester, excess and unreacted alkanol and impurities resulting from the esterification of p-hydroxybenzoic acid with said alkanol, which comprises heating the reaction mixture to a temperature of 100 to 170° C., then passing live steam into the thus-heated reaction mixture, whereby said unreacted alkanol and impurities are expelled, and discontinuing the introduction of the live steam when the reaction mixture residue, after being dried, has a maximum melting point, said alkyl group being alkyl of from 1 to 12 carbon atoms and said alkanol being the corresponding alkanol.

2. A process for the recovery of alkyl ester of p-hydroxybenzoic acid from a reaction mixture consisting essentially of said ester, excess and unreacted alkanol and impurities resulting from the esterification of p-hydroxybenzoic acid with said alkanol, which comprises heating the reaction mixture to a temperature of about 150 to 170° C., then passing live steam into the thus-heated reaction mixture under atmospheric pressure, whereby said unreacted alkanol and impurities are expelled, and discontinuing the introduction of the live steam when the reaction mixture residue, after being dried, has a maximum melting point, said alkyl group being alkyl of from 1 to 12 carbon atoms and said alkanol being the corresponding alkanol.

3. A process for the recovery of alkyl ester of p-hydroxybenzoic acid from a reaction mixture consisting essentially of said ester, excess and unreacted alkanol and impurities resulting from the esterification of p-hydroxybenzoic acid with said alkanol, which comprises heating the reaction mixture to a temperature of 100 to 150° C., then passing live steam into the thus-heated reaction mixture under subatmospheric pressure, whereby said unreacted alkanol and impurities are expelled, and discontinuing the introduction of the live steam when the reaction mixture residue, after being dried, has a maximum melting point, said alkyl group being alkyl of from 1 to 12 carbon atoms and said alkanol being the corresponding alkanol.

4. In a process for the recovery of alkyl ester of p-hydroxybenzoic acid, the alkyl being alkyl of 1 to 12 carbon atoms, from a mixture thereof with impurities of greater volatility than said ester, the steps of heating the said mixture to a temperature of 100 to 170° C., introducing live steam into the thus-heated mixture, withdrawing thus-liberated volatiles, and discontinuing the introduction of the live steam when the reaction mixture residue, after being dried, has a maximum melting point.

5. A method as in claim 1 wherein the alkanol is n-heptyl alcohol.

6. A method as in claim 4 wherein the alkyl ester of para-hydroxybenzoic acid is n-heptyl p-hydroxybenzoate.

7. A method as in claim 1 wherein the alkanol is n-propyl alcohol and, following the discontinuing of the introduction of live steam, the reaction mixture residue is dried and vacuum-distilled.

8. A method as in claim 1 wherein the alkanol is methanol.

References Cited by the Examiner

UNITED STATES PATENTS 2,198,582    4/1940    Grether et al. _____ 260—473

LORRAINE A. WEINBERGER, *Primary Examiner.*

SIDNEY B. WILLIAMS, JR., *Assistant Examiner.*